United States Patent [19]

Blytas et al.

[11] Patent Number: 5,756,639
[45] Date of Patent: May 26, 1998

[54] COPOLYMERIZATION OF POLYETHERPOLYOLS WITH EPOXY RESINS

[75] Inventors: George Constantine Blytas; Arthur Herman Hale, both of Houston, Tex.

[73] Assignee: Shell Oil Company, Houston, Tex.

[21] Appl. No.: 666,763

[22] Filed: Jun. 19, 1996

Related U.S. Application Data

[63] Continuation of Ser. No. 508,503, Jul. 28, 1995, Pat. No. 5,558,939.
[51] Int. Cl.$^6$ ................................................. C08G 59/02
[52] U.S. Cl. ........................... 528/110; 528/418; 549/378
[58] Field of Search ........................ 528/110, 418; 549/378

[56] References Cited

U.S. PATENT DOCUMENTS 5,076,364  12/1991  Hale et al. ............................. 166/279

Primary Examiner—Melvyn I. Marquis
Assistant Examiner—D. Aylward
Attorney, Agent, or Firm—Fredrik Marlowe

[57] ABSTRACT

A method for producing an epoxy polyetherpolyol having 15 to 75 wt. % epoxy comprising heating a polyol and catalyst to initiate condensation, removing water, introducing sufficient epoxy into the reaction mixture to give 15 to 75 wt. % epoxy in the product. Generally, between 0.5 and 1.19 moles of water per mole of polyol are removed. In one embodiment at least 95 wt. % of all of the polyol is introduced initially into the reaction zone. In another embodiment the condensation is terminated prior to 93 percent completion. Also provided are novel compositions suitable for drilling fluids, adhesives and coatings.

15 Claims, No Drawings

5,756,639

COPOLYMERIZATION OF POLYETHERPOLYOLS WITH EPOXY RESINS

This is a continuation of application Ser. No. 08/508,503, filed Jul. 28, 1995, Pat. No. 5,558,939.

BACKGROUND OF THE INVENTION

This invention relates to polyol condensation.

Polyol condensation products, such as diglycerine, are known constituents of drilling fluids. However, it is desired to produce drilling fluid additives with greater ability to prevent shale dispersion, improve wellbore stability, reduce fluid loss and reduce filter cake thickness. Cyclic ethers per se are disclosed as being produced by condensing an alcohol having an ester or ether group (rather than just an alcohol) in Dreyfus, U.S. Pat. No. 2,062,404 (Dec. 1, 1936). It is shown in Selden et al., U.S. Pat. No. 3,968,169 (Jul. 6, 1976) that glycerine can be condensed with an acid catalyst to give linear di- and tri-glycerol with a small amount of cyclic di- and tri-glycerol byproduct being produced. Alkali catalyzed condensation of glycerol to produce diglycerol and higher polyglycerols is disclosed in Alsop, U.S. Pat. No. 2,487,208 (Nov. 8, 1949). However, in fact, it requires very precise control of the alkali condensation reaction of a polyol to get a cyclic structure without getting undesirable reactions including, in the worst case, toxic acrolein. Alsop attempts to inhibit undesirable reactions by deactivating the catalyst halfway through the reaction.

SUMMARY OF THE INVENTION

It is an object of this invention to form epoxy polyetherpolyols by a condensation reaction and copolymerization.

It is an object of a more specific embodiment of this invention to avoid the production of undesirable reaction products during condensation of polyols.

It is yet a further object of this invention to produce a polyol having improved characteristics when employed in drilling fluids.

It is yet a further object of this invention to provide an epoxy-coated article.

In accordance with one embodiment of this invention an epoxy polyetherpolyol is produced by a condensation and copolymerization reaction comprising heating a polyol having at least three hydroxyl groups, at least two of which are vicinal, or a precursor or cyclic derivative thereof, under condensation conditions, and adding an epoxy resin to the reaction mixture in an amount sufficient to give 15–75 percent epoxy in the final reaction product.

In a more specific embodiment of this invention a polyethercyclicpolyol is produced by copolymerization and condensation reaction comprising heating glycerol under condensation conditions, which include a reduced pressure but an initial pressure of at least 180 mm Hg, wherein at least 95 percent of the glycerol to be used is introduced into the reaction initially, sufficient water is removed to produce cyclic ether units, and sufficient epoxy is incorporated into the reaction mixture to give greater than 6 wt. % epoxy in the resulting epoxy polyethercyclicpolyol product.

DETAILED DESCRIPTION OF THE INVENTION

It has been found that when substantial amounts of an epoxy resin are copolymerized with a polyol condensation product, the exothermic copolymerization reaction provides some of the heat for the endothermic condensation reaction thus simplifying the process and, at the same time, a product is produced which has superior characteristics in drilling fluid applications. This, then, allows stopping the reaction well short of completion which avoids the inadvertent production of undesirable reaction products and simplifies the process by allowing all, or substantially all, of the polyol reactant to be added to the reaction zone initially.

Definitions

References herein to pressure in terms of millimeters of mercury, mm Hg, or torr, refer to absolute pressure, i.e., any number below 760 represents a vacuum.

References herein to percent epoxy in the products refers to the weight percent of material originating with the epoxy monomer based on the total weight of the reaction product. Since no water is removed when the epoxy compound is copolymerized with an alcohol, any water which is split off is of no relevance to the weight percent epoxy.

References to percent polyol such as glycerol refer to the weight percent of polyol based on the total weight of polyol introduced throughout the reaction including the polyol monomer itself and the polyol necessary to produce any cyclic derivative which may be present in admixture with the polyol monomer as well as any polyol which would form from any polyol precursor which may be present. The water produced in the reaction comes exclusively from the polyol component.

Polyol Feedstock

Polyols that are at least trihydric and have at least two hydroxy groups in a vicinal position are required. Nonlimiting examples include monomers and oligomers of polyhydric alcohols (or their precursors, or combinations thereof) such as glycerol (which is the preferred feedstock), condensation products of glycerol such as diglycerols, triglycerols, tetraglycerols, pentaglycerols, and hexaglycerols, mixtures of glycerol and condensation products of glycerol such as diglycerol and triglycerols, mixtures of condensation products of glycerol, 1,5,6,9-decanetetrol, 1,2,4,5-cyclchexanetetramethanol, 1,2,4,7-heptanetetrol, 1,2,3,5-heptanetetrol, 4,4-dimethyl-1,2,3-pentanetriol, 1,3,4-cycloheptanetriol, 1,2,3-pentanetriol, 1,2,4-pentanetriol, 2,3,4-pentanetriol, butanetriols such as 1,2,4-butanetriol, 1,1-cyclopentanediol, 1,2,3-cyclopentanetriol, 1,2,3-hexanetriol, 1,2,4-hexanetriol, 1,2,3,4-hexanetetrol, 1,2,4-cyclohexanetriol, 1,2,5-cyclohexanetriol, 1,2,3,4-cyclohexanetetrol, 1,2,3,5-cyclohexanetetrol, sorbitol, mannitol and copolymers of ethylene glycol and propylene glycols with the preceding alcohols.

From 5 to 35 wt. % of the polyol can be replaced with a dihydroxy alcohol if it is desired to make a less water-soluble product. Suitable dihydroxy alcohols include those having 2 to 18 carbon atoms, preferably those having 4 to 14 carbon atoms. Suitable dihydroxy alcohols include ethylene glycol, propylene glycol, diethylene glycol and triethylene glycol, for instance.

Catalysts

Suitable catalysts include alkali metal hydroxides, alkali metal salts and other known condensation catalysts such as sodium tungstate or tin (IV) chloride. The preferred catalyst is a mixture of sodium hydroxide and sodium acetate. The total catalyst concentration can vary from about 0.1 to about 10 wt. % based on the weight of the polyol monomer, preferably 0.5 to 5 wt. %. In the case of alkali metal hydroxides/alkali metal salt catalysts, the weight ratio can vary from about 1:10 to about 10:1, preferably from 3:1 to 1:1.

Process Conditions

In a typical preparation in accordance with this invention, the polyol containing a small amount of catalyst is reacted in a distillation apparatus under conditions which allow water to be removed overhead, but not substantial amounts of monomers or dimers or trimers of the monomers.

The starting pH for the condensation reaction can range from 6 to 13.5, preferably from 8 to 11. The pH generally gradually declines during the process to 6.5 to 9.5, and preferably to 7 to 9. The materials removed overhead in the distillation, are generally acidic to neutral and have a pH ranging from about 3 to about 7.

The reaction mixture is heated under pressure sufficient to remove water with a minimal loss of monomer. For the preferred monomer, glycerol, the initial pressure is generally at least about 180 mm Hg and preferably between 250 and 500, more preferably 250 to 350 mm Hg absolute. The initial temperature is generally between about 175° and 275° C., preferably between 200° and 260° C., more preferably between 210° and 250° C. Under these conditions any free water, which is often present in very small amounts even in dry monomer, will be distilled off. Moreover, water produced with the condensation reaction will be distilled off continuously allowing the equilibrium-limited condensation reaction to proceed further toward completion. Water removal may be facilitated by bubbling an inert gas, such as nitrogen, through the mixture although this is generally not necessary. If done, such bubbling will also facilitate mixing.

The mixture may also be continuously stirred to ensure thermal equilibrium throughout. The dry monomer will then begin to rise in temperature. In the case of the preferred monomer, glycerol, it will begin to reflux at a temperature of about 200° to 270° C. at 250 to 500 mm Hg, indicating the onset of reactions which produce water by condensation of the glycerol. By maintaining a pressure of at least 180 mm Hg, the glycerol, which may volatilize along with the water, is condensed in an overhead condenser. Based on this guideline, appropriate pressures can easily be arrived at for other monomers.

During the course of the reaction the temperature with the preferred monomer, glycerol, is generally increased to a range of 250° to 300° C., preferably 251° to 280° C., more preferably 250° to 273° C. at essentially the initial pressure. Thereafter, the temperature is increased to 260 to 310, preferably 261 to 300, more preferably 280° to 287° C. at a pressure of less than 300, preferably less than 180, more preferably 40–130 mm Hg.

In a preferred embodiment the epoxy component addition is started immediately on the onset of condensation and is introduced continuously or in a plurality of aliquots throughout essentially the entire condensation reaction. This brings about several unexpected benefits. For one thing, there is less problem with loss of monomer overhead than in preparations in which the initial pressure is lower. More importantly, the copolymerization of the polyol or polyol condensation product with the epoxy is an exothermic reaction which imparts heat which produces some of the heat needed by the endothermic condensation reaction. This is an important synergistic effect with beneficial results on the energy efficiency of the process. In addition, when the purpose is to produce a drilling fluid additive, the presence of the epoxy results in a product having good characteristics even if the reaction is terminated after 0.774 to 1.09 moles of water are removed per mole of polyol reactant incorporated into the recovered product, whereas without the epoxy it is necessary to remove at least 1.11 moles of water per mole of polyol reactant incorporated into the recovered product for a good drilling fluid additive to be produced.

From this phenomena flows yet another advantage to the invention. Because the reaction can be terminated prior to removal of 1.11 moles of water per mole of polyol reactant incorporated into the reaction product, problems with the inadvertent production of undesirable reaction products are avoided. Instead of being required to operate between about 1.11 and 1.18 moles of water removal, preferably 1.15 to 1.18 moles of water removal in order to get a good product without production of undesirable reaction products, a good product can be obtained with great flexibility in carrying out the process. This allows operating at higher initial pressures (i.e., less vacuum), much greater reaction rates, thus increasing the production of product per unit of time (because of in-situ heat generation) and the use of less expensive monitoring equipment.

Thus, the entire reaction can be carried out to the desired degree of completion in less than 6 hours, generally less than 5 hours; indeed times of 1 to 4, more preferably 2 to less than 4 hours from initiation of condensation to end of condensation are easily obtained.

It is preferred, but not limiting, to add at least 95%, generally 100%, of the polyol to the reaction zone initially prior to the starting of the condensation. If desired, however, a portion of the polyol can be added at later stages in the reaction, for example, when the reaction temperature has reached 270° to 290° C. in the case of glycerol. By this time the pressure will have been generally reduced to 90 mm Hg or less, preferably 40 to 90 mm Hg. If this is done at all, the amount added can be from 1 to 15 percent by weight of the total polyol utilized in the process, generally at least 3, but less than 5 wt. %. The "later stage" polyol can be added continuously or in aliquots. If done at all, this will generally be done during the final 10 to 30 percent of the reaction. Upon addition of polyol at this point, a drop in the temperature of the reacting mixture occurs, the drop being indicative of the lower temperature of the added polyol and, more importantly, the endothermic nature of the reaction. The polyol can be presaturated with catalyst such as sodium hydroxide if desired. This "later stage" addition is to be distinguished from a small amount, generally 1 to 2% polyol which may be added at the very end of the reaction as a "quench" and which is not saturated with catalyst or otherwise added in conjunction with catalyst. In general, any such stepwise addition of additional polyol should be initiated after the reaction is at least 40 percent complete.

The final $M_w$ values obtained are a strong function of the maximum temperature used in the polymerization reaction. Typical maximum temperatures range from 250 to 295, preferably 255° to 285° C. at a pressure of 30 to 90 mm Hg, preferably 40 to 90 mm Hg.

In addition, use of the epoxy in amounts of at least 15% or, in combination with other process variables, in amounts of greater than 6 wt. % is what eliminates the need for adding monomer during the final 10 to 12 percent of the reaction cycle. This greatly reduces the cost of the process and gives a superior product.

At the time it is desired to terminate the reaction, which can be any time after about 0.7735, preferably 0.952 to 1.09 moles of water have been removed per mole of polyol reactant entering into the recovered product, the process of this invention allows several options.

First, if desired, a small amount, generally in the amount of 1 to 5, preferably 1 to 2 percent of the total monomer utilized, can be added without catalyst as a termination vehicle. Such monomer will evaporate and cool the reaction to below reaction temperature and/or react with easily reacted sites. This also tends to lessen or eliminate terminal epoxy groups which may be desirable in the case of producing drilling fluid additives.

On the other hand, if the purpose is to produce coating materials, it may be desired to have no polyol monomer "quench" at the end or even to add additional epoxy so as to purposely provide reactive epoxy groups at the end of the resulting product. Such products, particularly at the higher epoxy contents, i.e., 20 to 75 wt. %, preferably 20 to 45 wt. %, tend to make excellent coating compositions and adhesives.

While, in theory, as little as no water can be removed since the reaction of the epoxy with the polyol can result in a copolymerization with no evolution of water, in almost all instances at least a half mole of water is removed per mole of monomer, generally 0.9 to 1.10 moles of water per mole of monomer. In general, the removal of more than 0.5 moles of water per mole of monomer results in some cyclic ether structures and thus, in most cases, the epoxy polyetherpolyol produced hereby will contain some cyclic ether structures, but good products are also obtained with little or no cyclic ether structures.

Gradually the procedure results in an increase in the boiling point of the mixture brought about by the condensation which increases the molecular weight of the material.

Thus, as the degree of polymerization increases, and the amount of water removed from the monomer feed increases, the pressure over the mixture can gradually be decreased either in a continuous, preferably gradual, mode or if desired, incrementally, at selected reaction temperatures. For instance, with the preferred monomer, glycerol, it is possible to reduce the pressure to less than 150, preferably about 130 mm Hg when the mixture reaches 280° C. and later either gradually or incrementally, to reduce the pressure to 30–90, preferably 40–80 mm Hg at temperatures at or above 280° C., preferably about 284° to 290° C.

Dehydration in Relation to Feed Composition

It is preferable to remove between 0.5 and 1.19 moles of water per mole of polyol. If the feed contains an appreciable amount of predehydrated polyol polymers, then the remaining dehydration will be less than the 0.5 to 1.19 moles per mole of polyol as previously noted. As an example, for a known commercial glycerol product which typically contains 15 percent by weight of bis(hydroxymethyl)-dioxanes, and 85 percent by weight of glycerol the dehydration can be calculated as follows. For approximately 100 grams of feed there are 85 grams of glycerol (0.92 moles) and 15 grams of bis(hydroxymethyl)-dioxane (0.1014 moles). The glycerol component will have to lose a maximum 0.92×1.19=1.0948 moles of water. The 0.1014 moles of bis(hydroxymethyl)-dioxane is derived from 0.2028 moles of glycerol by removal of 0.2028 moles of water; no more than 1.19 total moles water per mole of glycerol should be removed, i.e., 0.2028×1.19=0.2413 moles. Thus, it is necessary not to remove more than 0.2413−0.2028=0.0385 moles of water. The total to be removed is a maximum of 1.0948 moles from the glycerol+0.0385 moles from the bis(hydroxymethyl)-dioxane=1.1333 moles water (or approximately 1.13 moles maximum) from the 100 grams of the known commercial product.

Epoxy Component

Epoxy resins are characterized by the presence of a three-membered cyclic ether group commonly referred to as an epoxy group, 1-2-epoxide, or oxirane. Suitable epoxy resins include diglycidyl ethers, triglycidyl ethers and tetraglycidyl ethers. In general, at the higher epoxy levels such as 15 to 75 wt. %, preferably 20 to 50 wt. %, difunctional epoxy compounds are preferred. At slightly lower epoxy contents, polyfunctional epoxies having more than two functional groups may be preferred.

A particularly useful epoxy for the higher epoxy content products is a difunctional glycidyl ether such as that sold by Shell Oil Company under the trademark "EPON 828".

While Applicants do not wish to be bound by theory, it is believed that the use of epoxy compounds having more than two functional groups such as tri- and tetraglycidyl ethers will direct polymerization along more than one direction in a planar configuration. The use of such epoxies also results in a composition particularly suitable for use as a drilling fluid additive to enhance wellbore stability. Additionally, the attachment of several polyetherpolyols onto the same central molecule of polyglycidyl ether allows multiple coordination of cationic species to occur through the electron donating oxygen atoms in the ether linkages, which results in formation of large molecular aggregates that can inhibit the migration of water molecules from the aqueous phase of water-based drilling mud onto the hydrophilic clay solids of the formation. Conventional drilling muds containing epoxy polyetherpolyols seem to act in essentially the same manner as oil-based muds.

The following epoxies are considered useful in the present invention.

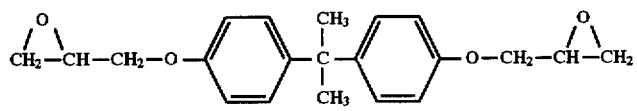

"EPON 828"

(trade name for epoxy manufactured by Shell Oil Company)

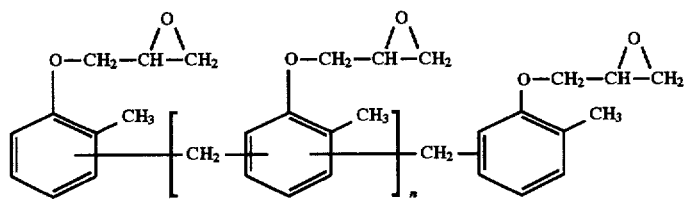

"EPON DPS 164"

-continued
(trade name for epoxy manufactured by Shell Oil Company)

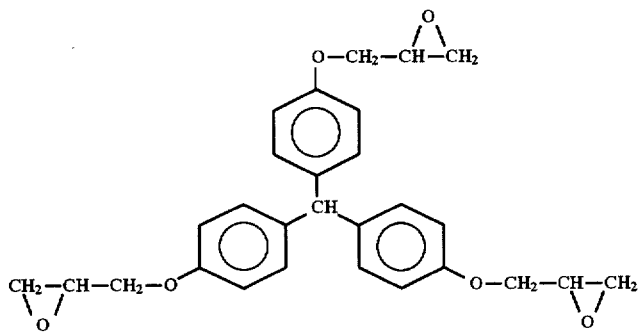

"TACTIX 742"
(trade name for epoxy manufactured by Dow Chemical Company)

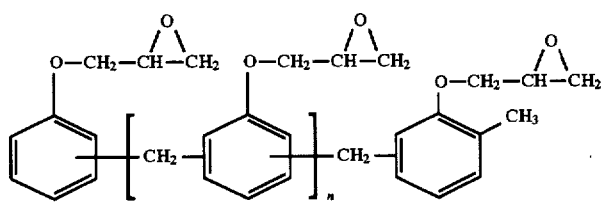

"NOVOLAC"
(trade name for epoxy manufactured by Shell Oil Company)

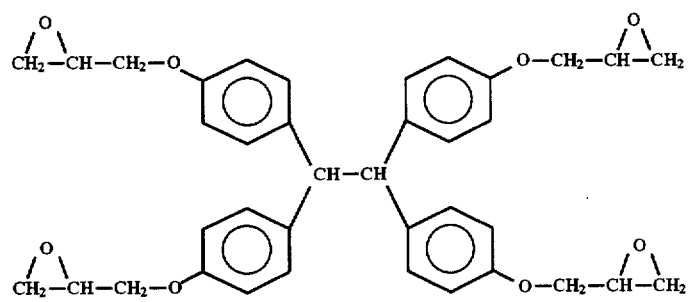

"EPON 1031"
(trade name for epoxy manufactured by Shell Oil Company)

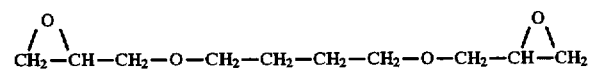

"HELOXY 67"
(trade name for epoxy manufactured by Rhone-Poulenc)

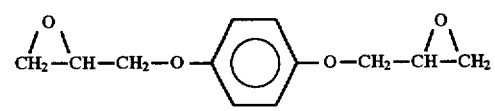

"HELOXY 69"
(trade name for epoxy manufactured by Rhone-Poulenc)

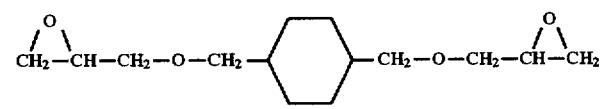

"HELOXY 107"
(trade name for epoxy manufactured by Rhone-Poulenc)

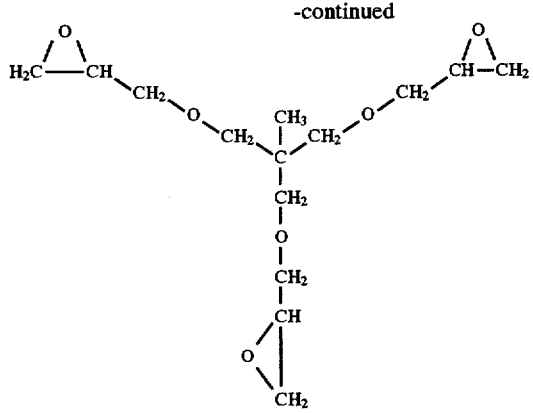

"HELOXY 5044"
(trade name for epoxy manufactured by Rhone-Poulenc)

As noted hereinabove, the epoxy sold by Shell Oil Company under the trade name "EPON 828" is preferred, particularly at higher epoxy levels. The non-aromatic epoxy sold by Rhone-Poulenc under the trade name "HELOXY 67" is also quite suitable. The trifunctional epoxy sold by Dow Chemical Company, "TACTIX 742" is also a preferred species, particularly at the lower epoxy levels. A suitable monofunctional epoxy is para-tert-butylphenyl glycidyl ether.

Epoxy Polyetherpolyol Products

While not wishing to be bound by theory, Applicants believe the following structural formula represents the general molecular structure of the resulting product.

The designation "EP" refers to the central portion of the epoxy resin; the designations "F1", "F2" and "F3" represent the two carbons, three hydrogens and one oxygen of the three-member epoxy ring with the provision that there is always at least one, generally at least two three-member epoxy functional groups. F1 is shown in the instance where the initial reaction with alcohol converts an epoxy group to two ether groups, thus producing a cyclic structure on the end of the epoxy molecule. F3 shows the result of breaking the epoxy bond to form an OH group and a linear ether. F2 represents a functional group which does not react; generally, there will be essentially no unreacted functional groups unless the condensation/polymerization is purposely terminated in a manner to give some unreacted groups as discussed hereinabove.

Although the 6-member rings are shown in the cis configuration, the trans configuration is equally possible. Occasionally, formation of 5- and 7-member rings is also encountered with 5-member rings favored at very high reaction temperatures.

The epoxy polyetherpolyols of this invention have at least one entity which is the remnant of the epoxy molecule, at least two hydroxyl groups, at least two ether groups, and at least 3 carbon atoms derived from the polyol. Thus, this invention broadly encompasses monofunctional glycidyl ethers reacting with one polyol although, generally, the epoxy component is at least difunctional. More preferably, the polyetherpolyols are polyethercyclicpolyols having at least five carbon atoms derived from the polyol, four ether linkages and at least five hydroxyl groups.

Weight average molecular weights, $M_w$, preferably range from 5,000 to 500,000.

The number average molecular weight $M_n$ is determined by the formula:

$$M_n = \frac{\Sigma_i n_i M_i}{\Sigma_i n_i}$$

wherein
i=all molecules in the sample,
$n_i$=the number of molecules, and
$M_i$=the molecular mass of each molecule.

This is the average molecular weight obtained when the total weight of the sample is divided by the number of molecules

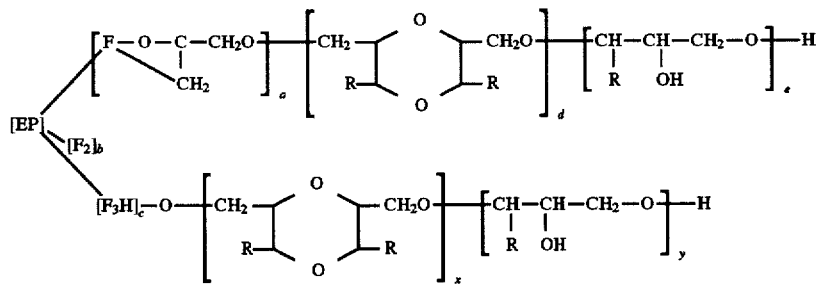

$a \geq 0$; $b \geq 0$; $c \geq 0$; $a+b+c \geq 1$; $a+c \geq 1$; $d \geq 0$; $e \geq 0$; $x \geq 0$; $y \geq 0$; $x+y \geq 1$ and if a, b, and x are all 0 and c is 1, $y \geq 2$.

R can be H, alkyl, ether, or hydroxyalkyl.

in the sample. This molecular weight determines the effect of the sample composition on the osmotic pressure and hence, the effect of the sample composition on the freezing point or other colligative properties of the total mixture.

However, in the preparations of this invention the values of $M_n$ obtained by GPC are affected by the presence of small ionic species from the catalyst system and hence are not very accurate representations of the molecular size.

The weight average molecular weight $M_W$ is determined by the formula:

$$M_w = \frac{\sum_i n_i M_i^2}{\sum_i n_i M_i}$$

This molecular weight number weighs molecules proportionally to their molecular weight in the averaging process; that is, the molecular weight $M_i$, is multiplied by the weight $n_i M_i$ of material of that molecular weight rather than by the number of molecules. This type of average reflects the effect of the sample composition on those properties which depend on the size of the individual molecules, such as effectiveness in light scattering, or ability of the molecule to penetrate into small openings or plug or cover such openings. Thus, a high $M_W$ would be beneficial if penetration of the molecules into the interplanar structure of layered clays in the formulation is to be avoided. While the invention is not limited by this theory, it is believed that when polyethercyclicpolyols of this invention are used in drilling fluids, the presence of molecules possessing large volumes minimizes the swelling of clay components in the wellbore, thereby improving wellbore stability. $M_W$ is an important property in the context of this invention. However, other factors such as hydrophobicity are also important in the high epoxy polyetherpolyol structures. The epoxy molecule imparts hydrophobicity as does the incorporation of dihydroxy alcohols as discussed hereinabove.

The centrifuge molecular weight is determined by the formula:

$$M_c = \frac{\sum_i n_i M_i^3}{\sum_i n_i M_i^2}$$

The ratios $M_W/M_n$ and $M_Z/M_W$ are also an indication of the spread or polydispersity in the molecular weight of molecules present in the sample, and by definition $M_W \geq M_n$. The ratio of $M_Z/M_W$ ranges from 1.5 to 25, and in the most preferred formulations it ranges from 2 to 15. The polydispersity of molecular weights is underscored by the appearance of a characteristic binodal molecular weight distribution in virtually all thermal polyethercyclicpolyol samples.

In order to attain high $M_W$ values it is necessary to carry out dehydration as far as possible or to incorporate high proportions of epoxy compound, or both. By dehydration under gradually decreasing pressure it is possible to achieve a degree of dehydration which approaches and exceeds 1 mole of water per mole of glycerol. At this point, theoretically the glycerol feed could have polymerized to yield a single molecule of infinitely high molecular weight. However, in the course of distillation of glycerol from a basic medium, extensive cyclization takes place, which yields compounds such as cis- or trans-2,5-bis (hydroxymethyl)-p-dioxane, cis- or trans-2, 6-bis (hydroxymethyl)-p-dioxane and the glycerine acetal of hydracrylaldehyde, or other 5-, 6-, or 7-membered ring structures of which the first two are predominant. The polycondensation of such cyclic structures with linear or branched polyglycerols yields polyethercyclicpolyols.

Known commercial mixtures of bis(hydroxymethyl)-p-dioxanes and polyols can react to produce polyethercyclicpolyols. Polyols, e.g., polyglycerols, of a degree of dehydration corresponding from 0.5 to 1.0 moles water per mole of polyol are suitable feedstock. Footstill bottoms (heavy ends from the manufacture of glycerol) are mixtures of glycerol, bis(hydroxymethyl)-p-dioxanes, linear polyglycerols, and small amounts of low molecular weight polyethercyclicpolyols, are useful feedstock.

Byproduct or effluent streams from other existing processes for which the principal products are resins, soaps, and the like, can be excellent feedstocks. Exemplary are process streams of glycerol/glycidol mixtures which may also contain other components, for example, mixtures of glycerol, glycidol, epichlorohydrin, dimethyl ketone, isopropyl alcohol, and/or sodium chloride made in the manufacture of resins. Such streams may first be processed to remove the nonglycerol-related material, for example, sodium chloride. Effluent streams from processes such as resin manufacture fit this category of feedstock. Such streams may contain predominantly water and salt (10 to 15 percent by weight) with also small amounts of glycerol, glycidol, bis (hydroxymethyl)-p-dioxanes, and polyethercyclicpolyols of low molecular weight (and therefore initially ineffective for use in drilling fluids). For example, in an existing plant, the components of an effluent stream are 12 to 15 percent by weight sodium chloride, 0.3 to 2 percent by weight glycerol, 0.3 to 1.2 percent by weight glycidol, and less than 0.5 percent by weight polyglycerols, bis(hydroxymethyl)-dioxanes, and low molecular weight polyethercyclicpolyols, with the balance being water.

EXAMPLES

Example 1

A mixture of 556 g glycerol, 4 g of NaOH and 2.8 g of NaAc was placed in a 2-liter round bottom distillation flask and the pressure was adjusted to 300 torr using a $N_2$ blanket. The temperature of the mixture was brought to 246° C. at which point the solution began to react and dehydration/polycondensation was observed. The distillate from the reaction mixture contained water produced by the polycondensation reactions, along with some unreacted glycerol, and linear and cyclic glycerol dimers. By using a 15-inch high, 1-inch diameter Vigreaux column, equivalent to 10 plates, most of the non-aqueous components in the vapor phase were returned into the kettle where further condensation occurred, which resulted in increasing the boiling point of the reacting mixture (melt). In order to ensure efficient separation, the magnetically controlled reflux of the condenser was set at 1:1. The actual reflux may have been greater than that ratio due to condensation occurring all along the height of the distillation column.

In about one and one-half hours after heating was stopped and as the kettle temperature rose to 263° C. at 300 torr, slow addition of "EPON 828" was begun. A total of 165 g of EPON 828 were added over a period of 65 minutes, during which time the kettle temperature rose to 280° C. while, at the same time, the pressure was lowered through 190 torr, then to 130 torr and finally to 80 torr. The reaction continued for an additional 65 minutes at which time the temperature reached 285° C. at 40 torr. The reaction was then discontinued. The total duration, from the time the system started being heated to the end, was 3 hours and 45 minutes.

From the material balance it was estimated that 1.07 moles of water were removed per mole of glycerol present as a polymer in the end product.

The product was diluted by addition of water to a 50 wt. % water solution. This solution had a viscosity of 32 poises.

According to GPC, in a 3-column system, the molecular weights were as follows: $M_w=84,000$ and $M_z=298,000$.

The epoxy content of the resulting polymer was 29.8 wt. %. The overall product yield was 76%.

Example 2

Using the same equipment as in Example 1, and using 553 g of glycerol, 5.6 g NaOH, 2.8 g of NaAc, a preparation was carried out in which 166 g of EPON 828 were added over a period of 72 minutes. While the EPON 828 was being added the temperature went from 260° C. to 300° C. to 280° C. at 130 torr. The reaction was continued for an additional 52 minutes at 130 torr before being stopped. The degree of dehydration in this preparation was 0.92 moles of water per mole of glycerol in the polymeric product. The molecular weights obtained by GPC were $M_w=30,500$ and $M_z=303,000$. The viscosity of the 50 wt. % solution in water at 25° C. was 250 cps. The percent epoxy in this preparation is 28.5% and the total product yield was 80%.

The lower viscosity and lower $M_w$ values are consistent with the lesser degree of dehydration relative to Example 1.

Example 3

Using the same equipment as in Example 1, and using 371 g of glycerol, 2.6 g of NaOH and 1.9 g of NaAc a copolymer was prepared in which 231 g of EPON 828 were incorporated over a period of 1 hour and 50 minutes. While the EPON 828 was being added the temperature rose from 250° C. at 300 torr to 273° C. at 300 torr. The reaction was continued for another 3 hours after the end of EPON addition, during which time the temperature of the mixture rose from 263° C. at 300 torr to 287° C. at 40 torr. The degree of dehydration was 0.98 moles of water per mole of polymerized glycerol. The molecular weights obtained by GPC were $M_w=318,500$ and $M_z=703,000$. The 50 wt. % water solution had a viscosity of 158 poises at 25° C. The epoxy content of the resulting polymer was 45.2 wt. % and the overall yield was 84%.

Example 4

A preparation of high epoxy polymer was made in a 1-liter glass reactor provided with a stirrer and equipped with a 9-inch Vigreaux column equivalent to 5 plates. In this preparation, 552.7 g of glycerol, 4 g of NaOH and 2.8 g of NaAc were heated under 300 torr pressure. The polycondensation reaction began at 210° C. at 300 torr. A total of 110 g of EPON 828 were added over a period of 52 minutes while the temperature went from 261° C. at 300 torr to 284° C. at 130 torr. The reaction was continued for an additional 48 minutes during which time the temperature rose from 284° C. at 130 torr to 286° C. at 40 torr. A final addition of 24 g of glycerol, saturated with NaOH, was then made at 281° C., 40 torr, and reaction was continued for 24 minutes. The molecular weights of the product were $M_w=28,600$ and $M_z=225,000$. The viscosity of a 50 wt. % aqueous solution at ambient temperature is 350 cps. The extent of dehydration was 1.1 moles of water removed per mole of glycerol in the polymer. The epoxy content of the resulting polymer was 22.9% and the product yield was 70%.

The preceding Examples show termination between 0.92 and 1.1 moles of water removed per mole of polyol.

The following Example 5 represents a less preferred embodiment of the invention where the reaction was run to about 1.15 moles of water removed per mole of glycerine reactant. Nonetheless it does show that by adding most or all of the polyol initially and using a significant amount of epoxy, a good product can be obtained and the reaction rate controlled satisfactorily.

Example 5

Using the same equipment as in Example 1, and using 552 g of glycerol, 4.0 g NaOH and 2.8 g of NaAc, a preparation was made in which was added 50 g of EPON 828 over a period of 1 hour and 35 minutes. While the EPON 828 was being added, the temperature rose from 247°C. at 300 torr to 256° C. at 300 torr. The reaction was continued for an additional 3 hours and 30 minutes after the end of EPON addition, during which time the temperature of the reacting mixture rose from 256° C. at 300 torr to 287° C. at 13- torr. The degree of dehydration in this preparation was 1.15 moles of water produced per mole of glycerol in the polymeric product. The molecular weights obtained by GPC were: $M=16,300$, and $M_z=122,000$, and the viscosity of the 50 wt. % solution in water at 25° C. was 108 cps. The percent epoxy in this preparation was 11.2% and the total product yield was 73%.

Example 6

Samples were tested for shale stabilization based on the ability to inhibit dispersion as follows:

Into 100 mls of water was introduced 2.5 g of 6 to 10 mesh-sized shale. The water contained 10 wt. % sodium chloride and 5 wt. % epoxy polyethercyclicpolyol. Each sample was hot rolled at 150° F. for 12 hours and the percent retained on a 10-mesh screen measured. This is a very severe test of shale stabilization and in the absence of the polyalcohol the percent retained would be essentially zero, i.e., all of the shale would be broken up and go through the screen. As can be seen from FIG. 2, as little as 0.25 wt. % of the 30% epoxy polyethercyclicpolyol gave greater dispersion inhibition than 5% of the 3.5% epoxy polyethercyclicpolyol. This is all the more remarkable when it is considered that the 3.5% epoxy material performed relatively well (as noted, this is a very severe test). At 30% epoxy and with only 1–20th as much active ingredients the dispersion inhibition is improved from about 25% to 35–65%.

While this invention has been described in detail for the purpose of illustration, it is not to be construed as limited thereby but is intended to cover all changes and modifications within the spirit and scope thereof.

What is claimed is:

1. A method for preparing an epoxy polyetherpolyol by copolymerization and condensation comprising:

(a) heating in a reaction zone a reaction mixture comprising a catalyst and a reactant selected from the group consisting of (1) a polyol having at least three hydroxyl groups of which at least two of the hydroxyl groups are vicinal, (2) precursors of the polyol, (3) linear or cyclic derivatives of the polyol, and (4) mixtures thereof, said heating initiating said condensation;

(b) admixing an epoxy resin with said reaction mixture in an amount sufficient to give 15 to 75 wt. % epoxy in said epoxy polyetherpolyol; and (c) continuing said condensation and copolymerization to remove water and produce said epoxy polyetherpolyol.

2. A method according to claim 1 wherein said catalyst is a mixture of sodium hydroxide and sodium acetate.

3. A method according to claim 1 wherein sufficient water is removed to give cyclic structures, thus producing an epoxy polyethercyclicpolyol.

4. A method according to claim 1 wherein said reactant is glycerol.

5. A method according to claim 1 wherein said epoxy is added in an amount sufficient to give 20 to 50 wt. % epoxy in said epoxy polyetherpolyol.

6. A method according to claim 1 wherein said condensation and copolymerization is carried out under vacuum using an initial pressure of at least 180 mm Hg and said condensation is terminated prior to 93 percent completion.

7. A method according to claim 1 wherein said condensation is terminated at between 77 and 92 percent completion.

8. A method according to claim 7 wherein at least 95 wt. % of said reactant is introduced into said reaction zone prior to the time said condensation begins.

9. A method according to claim 8 wherein said reactant is glycerol and no glycerol and catalyst are introduced into said reaction zone after said condensation begins.

10. A method according to claim 8 wherein said reactant is glycerol; said epoxy is a difunctional epoxy having two internal aromatic rings; said condensation and polymerization is carried out under vacuum at an initial pH of 8 to 10, an initial pressure of 250–350 mm Hg, and condensation and polymerization is continued as the pressure is dropped to 40–130 mm Hg and the temperature is increased to 261°–300° C.; said catalyst comprises sodium hydroxide and sodium acetate; and sufficient water is removed to create cyclic structures thus producing an epoxy polyethercyclicpolyol.

11. A method according to claim 8 wherein said reactant is glycerol, said epoxy is a difunctional epoxy and wherein 1 to 2% glycerol free of catalyst is added at the termination of the reaction.

12. A method according to claim 8 wherein said reactant is glycerol, said epoxy is a difunctional epoxy and where additional epoxy is added at the termination of reaction.

13. A method according to claim 8 wherein said reactant is glycerol, said epoxy is a difunctional epoxy and said epoxy is added intermittently or continuously throughout said condensation from initiation of condensation to termination of reaction.

14. A method for preparing an epoxy polyethercyclicpolyol by copolymerization and condensation comprising:
  (a) heating in a reaction zone, under condensation conditions which include a reduced pressure which initially is at least 180 mm Hg, a reaction mixture comprising glycerol and a catalyst, said glycerol constituting at least 95 wt. % of glycerol to be used in said method;
  (b) removing water formed during said condensation; and
  (c) admixing an epoxy resin with said reaction mixture in an amount sufficient to give greater than 6 wt. % epoxy in said epoxy polyethercyclicpolyol.

15. A method according to claim 14 wherein no catalyst is added during the last 15 percent of said condensation, and wherein said epoxy has greater than two functional groups.

* * * * *